United States Patent [19]
Arnesen

[11] Patent Number: 4,801,370
[45] Date of Patent: Jan. 31, 1989

[54] FIELD GENERATOR FOR GENERATING AN ELECTROSTATIC FIELD IN A BODY OF LIQUID

[75] Inventor: Tore C. Arnesen, Ontario, Canada

[73] Assignee: 671135 Ontario Limited, Concord, Canada

[21] Appl. No.: 911,345

[22] Filed: Sep. 25, 1986

[51] Int. Cl.[4] .............................................. B03C 5/02
[52] U.S. Cl. .................... 204/302; 204/280; 204/286; 204/290 R
[58] Field of Search ............... 204/302, 280, 286, 288, 204/290 R, 304–308; 210/243, 748

[56] References Cited

U.S. PATENT DOCUMENTS

| | | | |
|---|---|---|---|
| 3,585,122 | 6/1971 | King | 204/302 |
| 3,936,376 | 2/1976 | Centineo | 210/425 |
| 4,024,047 | 5/1977 | Clark | 204/302 |
| 4,073,712 | 2/1978 | Means | 204/186 |
| 4,093,529 | 6/1978 | Strobach | 204/197 |
| 4,199,429 | 4/1980 | McMahon | 204/302 |
| 4,224,126 | 9/1980 | Bidwell | 204/197 |
| 4,514,273 | 4/1985 | Vollman | 204/196 |
| 4,545,887 | 10/1985 | Arnesen et al. | 204/280 |
| 4,579,640 | 4/1986 | Eades | 204/302 |

Primary Examiner—John F. Niebling
Assistant Examiner—William T. Leader
Attorney, Agent, or Firm—Donald E. Hewson

[57] ABSTRACT

A field generator for generating an electrostatic field within a liquid is provided with a cylindrical body having a protective non-conducting coating covering a major portion of its length, a first boss comprising a mounting boss enclosing one end of the body in protective sealing relation therewith and a second protective boss similarly mounted in protective sealing relation at the other end of the body independently of the first boss to provide a rodless field generator construction. In one embodiment the field generator is employed in combination with an enclosing pipe for conducting a flow of liquid past the field generator, the pipe being secured in axially constraining relation with at least one of the end bosses.

6 Claims, 3 Drawing Sheets

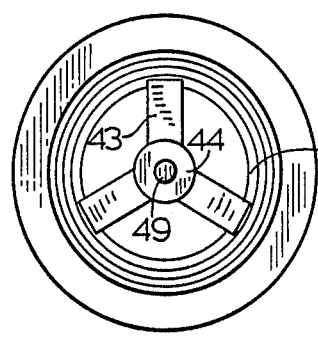
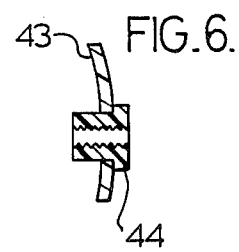
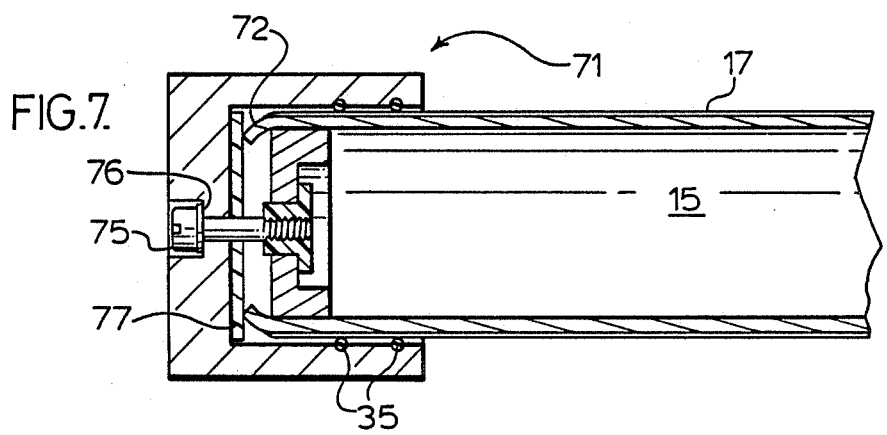
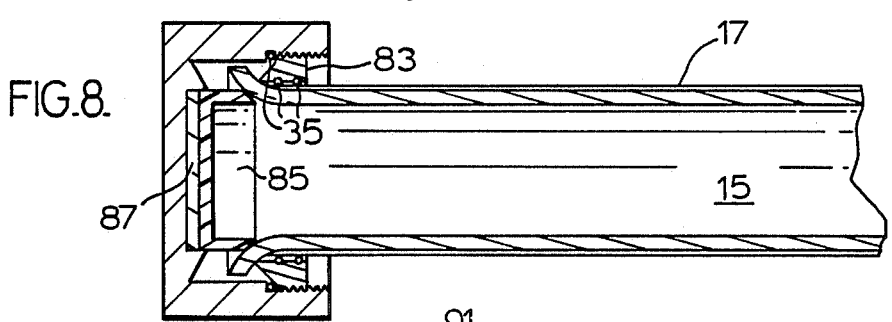
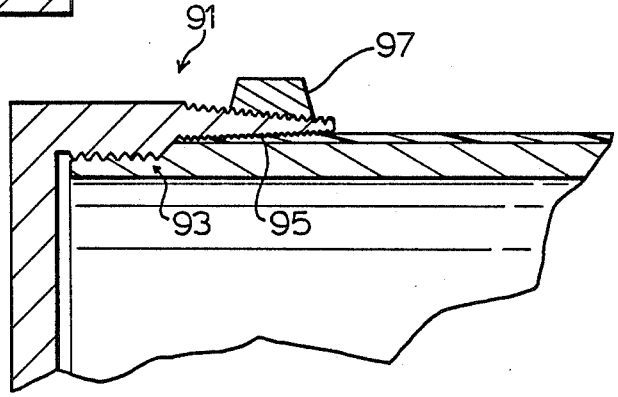

FIELD GENERATOR FOR GENERATING AN ELECTROSTATIC FIELD IN A BODY OF LIQUID

BACKGROUND OF THE INVENTION

This invention relates to electrostatic field generators and in particular to field generator element constructions.

Electrostatic field generators have been resorted to in water systems for purposes of controlling the presence of scale and as an alternative to the use of sacrifical anodes or the significant addition of chemical treatments to the water. Electrostatic field generator as their name implies relay upon the setting up of a high voltage electrostatic field and do not electrify the water. It is thought that the presence of an electrostatic field causes ionization of particles suspended in the water and tends to preclude nucleation, a necessary precursor to the formation of scale.

PRIOR ART

In ARNESEN et al. earlier U.S. Pat. No. 4,545,887, issued Oct. 8, 1985, there is disclosed an electrostatic system having a cantilevered rod like field generator for insertion into a liquid containing vessel whereby an electrostatic field was generated. The construction comprised a tube having protective end caps and a tension rod joining the opposing ends in mechanically secured relation. Earlier arrangements are to be found in the following U.S. Pat. No: 3,585,122, KING, issued June 15, 1971; U.S. Pat. No. 4,024,047, CLARK, issued May 17, 1977; U.S. Pat. No. 4,073,712, MEANS, issued Feb. 14, 1978; U.S. Pat. No. 4,199,429, McMAHON, issued Apr. 22, 1980, and in PCT Publication No. WO80/00226, RABBIT, issued Feb. 21, 1980.

BRIEF DESCRIPTION OF THE INVENTION

In accordance with the present invention there is provided an electrostatic field generator having a pair of end caps secured in protective relation to the active cylindrical portion of the field generator, wherein the end caps are secured to the field generator without placing reliance upon a central rod/electrode interconnecting the two end caps in a load transfer relation therebetween. An earlier series of embodiments as shown in the previously referred to ARNESEN et al patent relied upon a cylindrical construction having a pair of opposed ends formed of water proof insulating material, where each provides a cylindrical surface co-extensive with that of the aluminum tube embodied in the field generator. Over these co-extensive surfaces a sleeve of polytetrafluoroethylene (PTFE) is fitted, and heat shrunk into sealing insulating protective relation therewith. The use of two sleeves in superposed relation is more usual, so as to preclude any possible failure due to the possible presence of pinholes in the PTFE sleeve.

In place of the previous teaching in the ARNSEN et al patent wherein a tie rod extends axially of the field generator inload transfer relation between the inserted insulator end bushings, the two end bushings of the present invention are independently mechanically secured to the respective ends of the metallic tube. It will be understood that while certain advantages such as lightness and ease of working accrue from the use of an aluminum tube, the use of other conductive materials, both metal and non-metal is not essentialy precluded.

In one embodiment of the present invention, the portion of the insulator bushing inserted within the aluminum tube has a shallow groove of predetermined width extending about the periphery thereof, into which groove the aluminum tube is rolled, so as to grippingly engage the insulator.

A first arrangement of mechanical fastening means for securing the protective, sealing end cap over the bushing and PTFE sleeve is the provision of an O-ring within the sealing end cap to engage in gripping relation into the annular depression provided where the aluminum tube is rolled into the underlying insulator bushing. A pair of sealing O-rings, one on each side of the gripping O-ring, completes the assembly. An alternative arrangement involves the injection of the gripping O-rings as a fluid silicone rubber or other suitable elastomer, by way of one or more injection ports extending radially through the wall of the end sealing cap, the ports being conveniently positioned axially between the two O-ring seals.

In order to facilitate the insertion of the field generator body into the bore of the end sealing cap, an axially extending gallery provides gas communication from within the interior of the tube, and extending through the length of the insulator, to the cap. This thereby precludes the generation of significant air pressure behind the O-ring seals.

In a further embodiment the air gallery can be omitted, there being provided a sealing screw extending in anchoring relation through the crown of the end sealing cap in threaded engagement with an adjacent portion of the insulator bushing. An elastomeric seal, through which the securing screw extends, is compressed in sealing relation between the interior end surface of the sealing cap and the adjacent end surface of the insulator bushing. The passage through which the securing screw extends serves as an air exhaust passage, at the time of insertion of the insulator bushing and tube past the sealing O-rings of the end cap.

In yet a further embodiment, the axially extending securing screw can form an integral portion of the sealing cap; in which case the end cap is not penetrated, and the need for an elastomeric seal is avoided.

As an alternative to providing a peripheral groove in the inserted sealing bushing within which groove the tube is swaged in mechanical engaging relation, an outer end portion of the bushing can be diametrically relieved, so as to provide a step over which the tube end can readily be swaged in gripping relation with the insulating bushing.

Certain other embodiments dispense with the provision of insulator bushings inserted into the field generator tube. In one such embodiment of rolled groove in the tube wall adjacent the end thereof serves to engage a radially expansible spider which is drawn axially into jamming engagement against the inwardly protruding surface of the groove. In the case of a metal end cap, which is insulated in part by the O-ring seals, and by the PTFE sleeve, an additional end insulator disk is preferably inserted between the two metallic surfaces, namely the end cap and the tube end respectively, to ensure the preservation of elecrical insulation of the end cap.

It will be understood that the screw member interconnecting the protective end cap to the radially expansible spider must not provide an electrical bridge to the field generator tube. Consequently one or the other of the spider and the screw member must be non-conducting, or a suitable electrically non-conductive bushing must be interposed therebetween.

In a further similar embodiment, the distal end of the tube is turned inwardly as by spinning, in order to engage a bushing introduced therein from the remote (proximal) end. A centrally located insulating insert secured to the bushing receives in axially tightening relation a screw connected with the protective end cap. An insulating washer also is interposed between the interior of the end cap and the un-insulated rolled end of the field generator tube.

In all of the foregoing embodiments, fluid (i.e. liquid) sealing of the protective cap to the PTFE covered tube or insulator bushing relies upon one or more O-rings, usually of the precast type located within grooves provided in the inner peripheral surface of the end cap.

In a further embodiment, the O-ring seal may be replaced or supplemented by a bushing engaging an out turned belled portion of the end tube. The bushing has a threaded outer surface to which the protective cap is screwed. This exerts axial force in closing relation against the end cap, which in turn forces a nylon or other suitable collar axially in supporting relation within the interior of the belled tube.

In the case of the proximal end of the field generator, it is necessary to insulate the field generator tube from the mounting bushing, so that the tank or other liquid containing structure where the field generator is mounted is not made electrically live. At the same time, a mechanical attachment of the field generator to the mounting bushing needs to be made, and an effective connection also provided for attachment of the high tension (HT) lead. This is provided by a change in section of the field generator tube, against which a conductive spider is jammed. The spider, supported on a conductive tension rod, is pulled up by way of an insulated nut acting against a bulk head portion of the insulative mounting bushing, and the HT lead is directly connected to the free end of the tension rod.

A further embodiment of the proximal end utilizes a flaring of the tube, which is captured against a corresponding flared portion of the mounting bushing, in insulated relation therewith. A compression nut forming a portion of the mounting bushing exerts axial retaining force against the end of the tube to hold the flared tube portion in secured sealing relation against the end bushing.

A yet further construction for use in combination with headers and flow distributors utilizes a flow channel member of predetermined length relative to the field generator, within which the field generator is positioned. In this embodiment the end caps of the field generator offer only a sealing provision, there being no mechanical intertie to retain the end caps to the body of the field generator. An end closure of the flow channel supplies axial restraint, or even a predetermined axial compressive loading against at least one of the field generator end caps so as to apply a restraining mechanical load against the end cap to maintain the field generator in assembled relation. This end closure may comprise the proximal end mounting bushing of the subject field generator.

DESCRIPTION OF THE DRAWINGS

Certain embodiments of the invention are described, reference being made to the accompanying drawings, wherein:

FIGS. 4-9 show embodiments of the distal end having no insulator bushing provisions;

Figure 1:
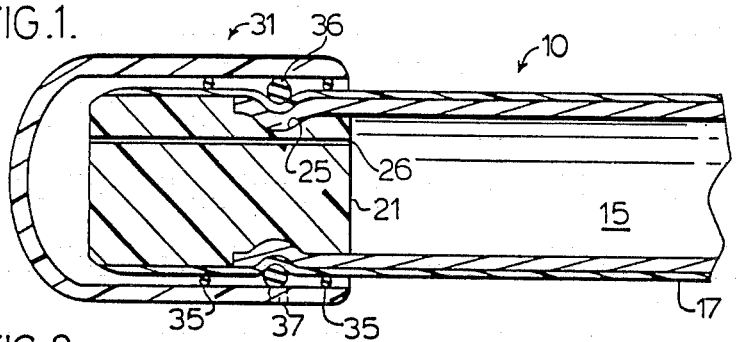
FIG. 1 is a diametrical cross section of the distal end of a field generator incorporating a first closure embodiment having a vented insulator bushing incorporated therewith, and a shearing O-ring mechanical connection.
Figure 2:
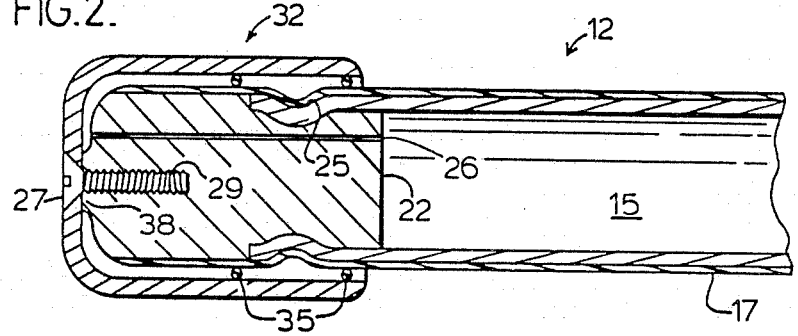
FIG. 2 is a like view of a further embodiment incorporating an alternative mechanical connection.
Figure 3:
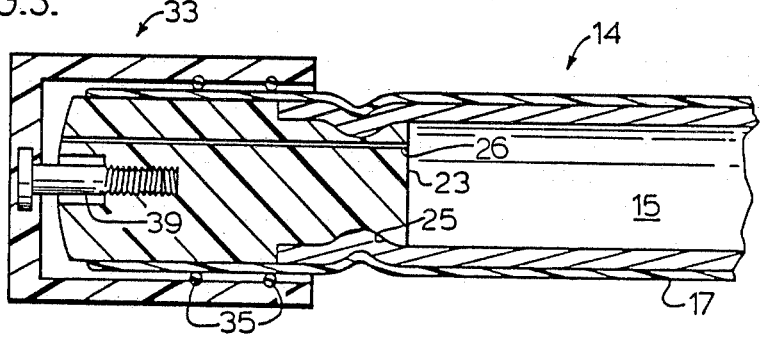
FIG. 3 is a like view of a field generator incorporating another variant of mechanical attachment.

DETAILED DESCRIPTION OF THE PREFERRED EMBODIMENTS:

Referring to FIGS. 1, 2 and 3, the distal ends 10, 12 and 14 respectively of these electrostatic field generator embodiments each have a metallic tube portion 15 and an overlying sleeve or sleeves 17 of PTFE or other suitable liquid proof, protective material of appropriate electrical and physical properties. The three embodiments each have an insulative end member respectively 21, 22, 23 having a stepped end portion inserted within the respective tube. A shallow peripheral groove 25 in the surface of end member 21, 22, and end shoulder on members 23 receive a portion of the sleeve 15 in rolled displaced relation therein, to securely fasten the end members 21, etc. within the tube 15. The overlying PTFE sleeve 17 extends axially in shrunken gripping relation over the tube and, in the first instance mechanically attached insulative end member 21. End members 21, 23 have a vent gallery 26 extending longitudinally therethrough.

Protective end caps 31, 32, 33 overlie the field generator ends, being sealed by way of silicone rubber O-rings 35 to the smooth surface of sleeve 17.

In the FIG. 1 embodiment, an interference fit O-ring 36 is positioned in force fitted relation to engage in the groove PTFE surface coincident with groove 25. In the event that insufficient mechanical force can be developed by a force fitted O-ring 36, a fluid O-ring of suitable plastic material such as silicone rubber can be injected under pressure through a radial passage 37 (shown in phantom). On setting up, this ring can generate sufficient shearing strength, to resist mechanical disassembly under normal operating conditions.

In the case of the FIG. 2 embodiment, the elastomeric seal 38 is interposed between end cap 32 and the end of tube 15, and insulative end member 22 seals a securing screw member 27. The screw 27 is driven into a threaded blind hole 29, of which an unthreaded portion grips the screw 27 in locking engagement.

For safety purposes, to preclude any backing off by the screw 27, one of the well known thread sealant systems such as that known as LOCTITE ® may be employed.

In the FIG. 3 embodiment, the end cap 33 is provided with a threaded mounting spindle 39. Rotation of the end cap 33 to drive the spindle 39 axially into threaded engagement ensures the secure mechanical attachment of end cap 33. Selection of an appropriate interference fit between the mating threads ensures that the assembly will resist normal working forces. In any case, the sealing O-rings 35 generate considerable frictional force against vibrational rotational of cap 33 about the generator polar axis, to resist incidental backing off of the threads.

In view of the high tension (usually 6000 volts) "HT" potential of the field generator, the need for safety, which is achieved by electrical and mechanical isolation, requires to be duly stressed.

Referring to the FIGS. 4 through 10 embodiments, the insulative inserted end bushings are dispensed with. The respective end caps 41, 71, 81, 91, 101 and 111 are each secured in somewhat varying manners, in order to achieve secure mechanical attachment while preserving the insulated condition of the tube 15.

Where an end cap is itself a suitable insulative material such as PTFE, which may be pure or glass filled, many of the insulative requirements are achieved automatically.

While in all present embodiments but one the sealing is shown as being achieved by the use of O-ring seals, it will be understood that alternative arrangements thereto are considered to lie within the scope of the present invention.

Figure 4:
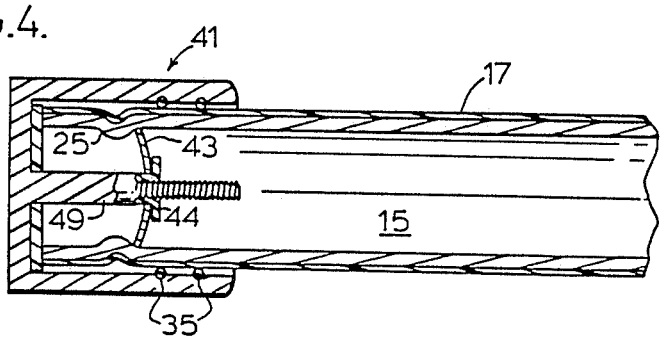

Referring to FIG. 4, a peripheral groove 25 in the tube 15 is engaged by a spider 43, to which is screwed a threaded spindle 49 forming a part of end cap 41. An insulative PTFE or nylon bushing 44 permits the use of a metal spindle 49.

In FIG. 5, the spider 43 is illustrated as having three symmentrically arranged legs. The shouldered form of the insulative nylon bushing 44 is shown in the partially sectioned side elevation view of FIG. 6.

In the FIG. 7 embodiment, the end portion of tube 15 is turned inwardly to form a retaining lip 72, against which abuts a plug 73, shown as being metal such as brass. An insulative bushing 74 is illustrated. A recessed screw 75 is sealed by way of a suitable elastomeric washer 76. An insulative disc 77 separates the end cap 71 from the end of tube 15. A suitable liquid weld system such as LOCTITE ® or other securing means are provided to preclude undesired relative rotation of the fastening elements in their respective housing, to ensure ready assembly and retention.

In the FIG. 8 embodiment, a metal end cap 81 threadedly engages a PTFE seal ring 83, drawing it axially into jamming engagement with the flared distal end of tube 15. A suitable annular bushing cap 85, recessed within end cap 81, applies resilient backing force thereto. Locking of the arrangement and relaxation of axial tolerances may be achieved by the provision of an elastomeric washer 87 which serves as a spring.

Sealing of the arrangement employs an additional O-ring 35, which may prove redundant in certain instances.

In the FIG. 9 embodiment, the sealing O-rings are dispensed with. A PTFE end cap 91 has an interior thread which engages a threaded portion 93 of tube 15. A plurality of annular ridged 95 engage the PTFE sleeve in sealing relation, being a firm slide fit thereover. A locking thimble 97 of metal or PTFE further ensures the integrity of the connection, being a suitable material such as brass or PTFE and having a tapered thread complementary to the mating threads on the exterior of cap 91. In addition to warranting a tight engagement of ridges 95 with the PTFE sleeve 17, the thimble 97 affords additional protection to the field generator 10 against abrasion during installation.

Figure 10:
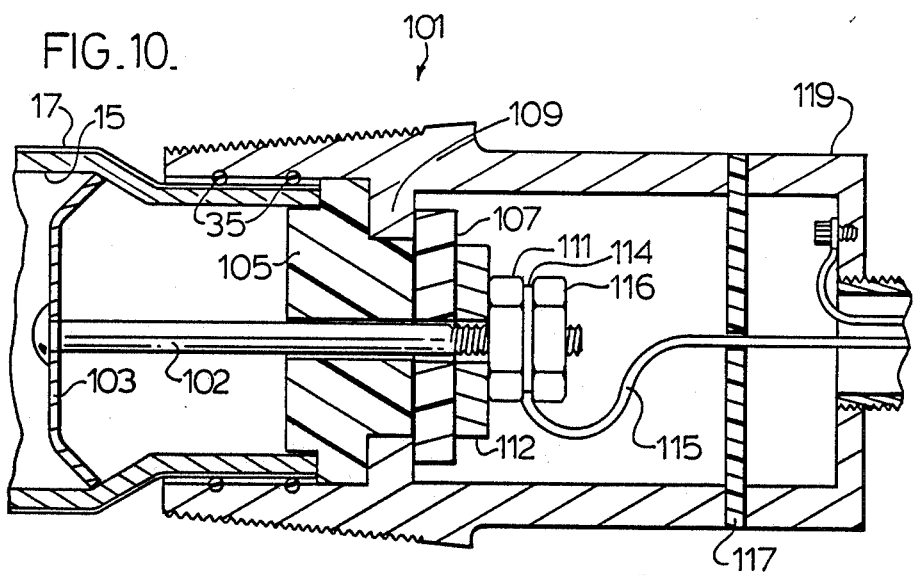
FIGS. 10 and 11 show embodiments of the proximal end of the field generator, with different electrical connection provisions.
Figure 11:
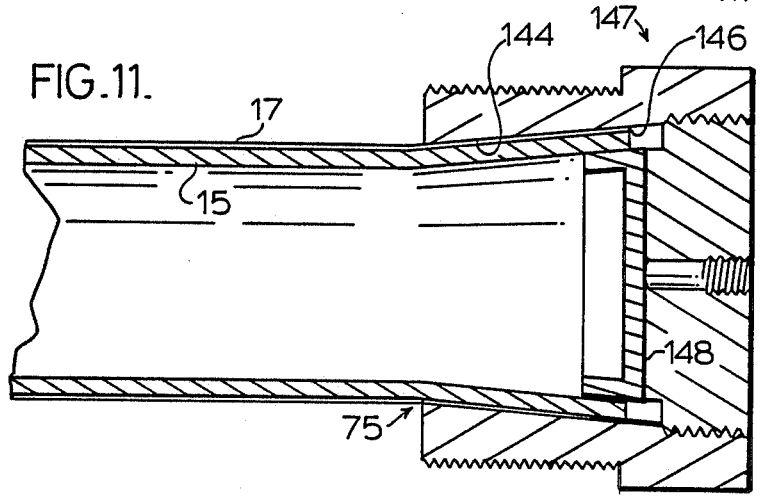

The FIGS. 10 and 11 embodiments relate to the proximal end of field generator 10. In the case of FIG. 10 a conducting rod 102 is anchored by way of a stiff spider 103 to the inner wall surface of tube 15. Insulator bushings 105, 107 insulate the rod 102 from making contact with an internal rib portion 109 of the end fitting 101. A nut 111 threadedly mounted on rod 102 applies compressive load against rib 109, so as to force the fitting 101 axially in compressing relation with a radially outer collar portion of bushing 105. The load is transferred by way of washer 112 which may be of the locking type.

A terminal lug 114 connects HT lead 115 in secured relation beneath terminal nut 116. A cap 119 is attached in protective relation with the HT lead 115 and its connection, an insulating and sealing washer 117 being interposed between cap 119 and rod 102. Within the space so enclosed, a ground connection for a grounding conductor is secured by way of a grounding screw. An alternative construction incorporates a high tension (HT) pigtail having the end thereof welded to the interior of the tube 15, and connecting to the HT supply for the system.

In the FIG. 11 embodiment tube 15 is conically flared having the sleeve 17 in shrunken relation thereover. A mating tapered surface 144 within the end fitting 147 provides a mechanical sealing joint, secured in place by end plug 148. In the case where the end fitting 147 is of PTFE the cap may be secured in sealing relation to the sleeve 17 by solvent or ultrasonic welding at 146.

Figure 12:
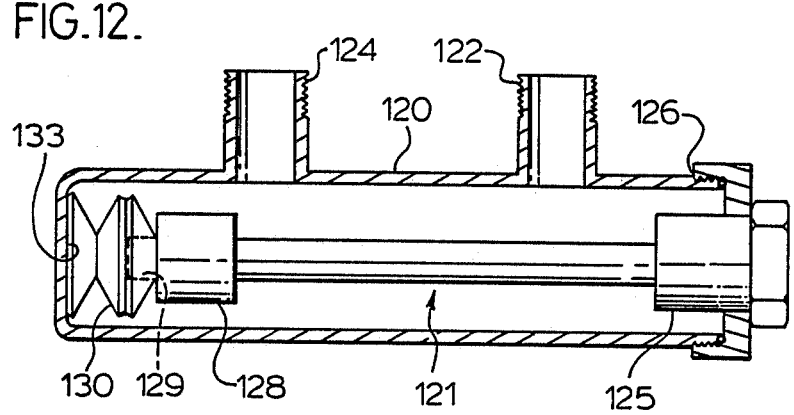
FIG. 12 shows a diametrical section of a subject field generator in combination with a flow header.

Turning to FIG. 12, there is shown a metal pipe liquid distribution header 120 having liquid access ports 122, 124. The field generator 121 has an extended flange at the proximal end thereof secured to the proximal end cap 125, being bounded by a threaded cap 126 for securing attachment to one end of the header 120.

At the distal end the end cap 128 has an external spigot 129 on which is mounted spring means 130, illustrated as a plurality of dished spring washers 130 in connected relation. The axial dimension and stiffness of the washers 130 is such that upon tightening of the cap 126 into sealed locking engagement with the pipe 120 a predetermined compressive load is applied against the end caps 125, 128 to hold them in secured relation with the tube portion of field generator 121. While not illustrated, the caps 125, 128 are provided solely with sealing O-rings such as O-rings 35 illustrated in FIG. 1, to provide effective sealing against the ingress of liquid to within the field generator 121. The requirement for mechanically retaining the caps 125, 128 in predetermined axially positioned sealing relation with the tube portion field generator 121, is provided primarily by the restraint of the co-operating header 120 and springs 130. However, the sealing O-rings such as O-rings 35 in the previously disclosed embodiments, provide sufficient frictional force to retain the field generator elements in assembled relation prior to the insertion thereof within the header 120.

Since the caps 125 and 128 permit a certain latitude of axial positioning relative to the main tube portion of field generator 121, it is possible to do without the end springs 130. However, in such an instance the axial clearance provided between distal spigot 129 and the adjacent pipe wall 133 must be carefully checked, to ensure the leakproof relationship of the end caps 125 and 128 to the tube portion of field generator, and the integrity of the system, including allowance for differential expansion effects produced by thermal variations. Owing to the provision of an external longitudinal mechanical restraint, the HT connection at the proximal end does not require to impart any mechanical constraint against the tube.

I claim:

1. An electrode adapted for use in generating a high voltage electrostatic field, said electrode having a proximal end and a distal end and comprising an electrically conductive tubed adapted to extend in use within a vessel containing a liquid medium;

an insulating sleeve overlying in insulating sealing relation a major portion of the outer surface of said tube;

a mounting boss secured in sealing relation with said sleeve and enclosing the proximal end of said electrode, having attachment means for securing the electrode in sealed entered relation within said vessel;

conductor means extending toward the distal end of the electrode from within said mounting boss making electrical connection with said tube;

a protective distal end cap mounted in sealing relation over the distal end of said sleeve and said tube;

an insulative end member inserted in the distal end of the tube, said end member having a first peripheral groove into which the tube is swaged in mechanically engaging relation, a second peripheral groove thereby being formed in the outer surface of the tube and overlying sleeve, the distal end cap overlying said second peripheral groove;

and seal means interposed between said distal end cap and said second peripheral groove in mechanically securing relation to substantially preclude axial displacement of said distal end cap from off said insulating sleeve, whereby said distal end of said electrode is maintained electrically insulated and mechanically protected against ingress of said liquid into contact with said tube.

2. The electrode as set forth in claim 1, wherein said insulative end member is vented longitudinally to facilitate mounting of said distal end cap therealong.

3. An electrode adapted for use in generating a high voltage electrostatic field, said electrode having a proximal end and a distal end and comprising an electrically conductive tube adapted to extend in use within a vessel containing a liquid medium;

an insulating sleeve overlying in insulating sealing relation a major portion of the outer surface of said tube;

a mounting boss secured in sealing relation with said sleeve and enclosing the proximal end of said electrode, having attachment means for securing the electrode in sealed entered relation within said vessel;

conductor means extending toward the distal end of the electrode from within said mounting boss making electrical connection with said tube;

a protective distal end cap mounted in sealing relation over the distal end of said sleeve and said tube;

an annular sealing ring over the distal end of the tube;

wherein the distal end of the tube is flared, an interior portion of the distal end cap is provided with threads, and the distal end cap threadingly engages the annular sealing ring drawing it axially into jamming engagement with the flared end of the tube, thereby positively axially securing the distal end cap in protective sealing and insulating relation to said tube to substantially preclude mechanical disassembly of the distal end cap from the tube.

4. An electrode adapted for use in generating a high voltage electrostatic field, said electrode having a proximal end and a distal end and comprising an electrically conductive tube adapted to extend in use within a vessel containing a liquid medium;

an insulating sleeve overlying in insulating sealing relation a major portion of the outer surface of said tube;

a mounting boss secured in sealing relation with said sleeve and enclosing the proximal end of said electrode, having attachment means for securing the electrode in sealed entered relation within said vessel;

conductor means extending toward the distal end of the electrode from within said mounting boss making electrical connection with said tube;

a protective distal end cap mounted in sealing relation over the distal end of said sleeve and said tube, wherein the distal end cap has an interior non-conducting threaded portion thereof in threaded engagement with an end portion of the tube, and wherein the distal end cap has a skirt portion extending toward the proximal end of tube and overlying the sleeve, the skirt portion including a plurality of shaped annular ridges facing the sleeve;

and a separable annular ring secured in radial compressive relation over the skirt portion of the distal end cap causing the ridges to engage the sleeve in sealing relation, the distal end cap being axially secured in protective sealing and insulating relation to said tube to substantially preclude mechanical dissassembly of the distal end cap from the tube.

5. The electrode as set forth in any one of claims 1, 3 and 4, wherein said mounting boss includes an integral rib portion;

said conductor means comprising rod means secured in electrical contacting relation with an interior surface of said tube extending in spaced relation past said rib portion;

nut means threadedly engaging said rod means bearing indirectly in insulated relation against said rib portion, to secure said mounting boss in axially compressed relation with said tube.

6. The electrode as set forth in claim 5, wherein an insulated conductor means is secured in electrical conducting relation to said rod means.

* * * * *